United States Patent Office 3,390,449
Patented July 2, 1968

3,390,449
METHOD FOR PREPARATION AND ENCAPSULATION OF GERMANIUM GAMMA RAY DETECTORS
Richard J. Fox, Oak Ridge, Tenn., assignor to the United States of America as represented by the United States Atomic Energy Commission
Filed July 18, 1966, Ser. No. 566,091
2 Claims. (Cl. 29—580)

The present invention was made in the course of, or under, a contract with the U.S. Atomic Energy Commission.

This invention relates to semiconductors for detecting radiation, and more particularly to a method for preparing and encapsulating lithium-drifted germanium detectors for detecting gamma rays and high energy charged particles.

It is well known in the art that germanium gamma ray detectors have a decided advantage over silicon gamma ray detectors. It is further known that the range of the germanium detectors can be extended to higher energy applications by the "lithium drift" technique which results in a germanium P-I-N junction (Nature, vol. 193, p. 669). However, lithium-drifted germanium detectors prepared by the prior art methods are unstable, i.e., there is a tendency for out-diffusion and subsequent oxidation of the lithium so that the surface of the N side of the junction reverts to its initial P-type conductivity. Thus, a P-I-N-P structure results and the reverse leakage current increases due to excessive injection of holes into the junction by the second P-type surface layer. In the prior art this undesirable P-type layer was periodically removed by etching.

Applicant with a knowledge of the problems of the prior art has for an object of his invention the provision of a method for encapsulating P-I-N junction germanium radiation detectors which will ensure that the Li-doped surface remains stable for an indefinite period without reversion of the N-type layer to a P-type surface.

Applicant has as another object of his invention the provision of a method for encapsulating germanium radiation detectors that overcomes the tendency for out-diffusion of the lithium and eliminates the loss of lithium from this source.

Other objects and advantages of my invention will appear from the following specification and accompanying drawings, and the novel features thereof will be particularly pointed out in the annexed claims.

Figure 1:
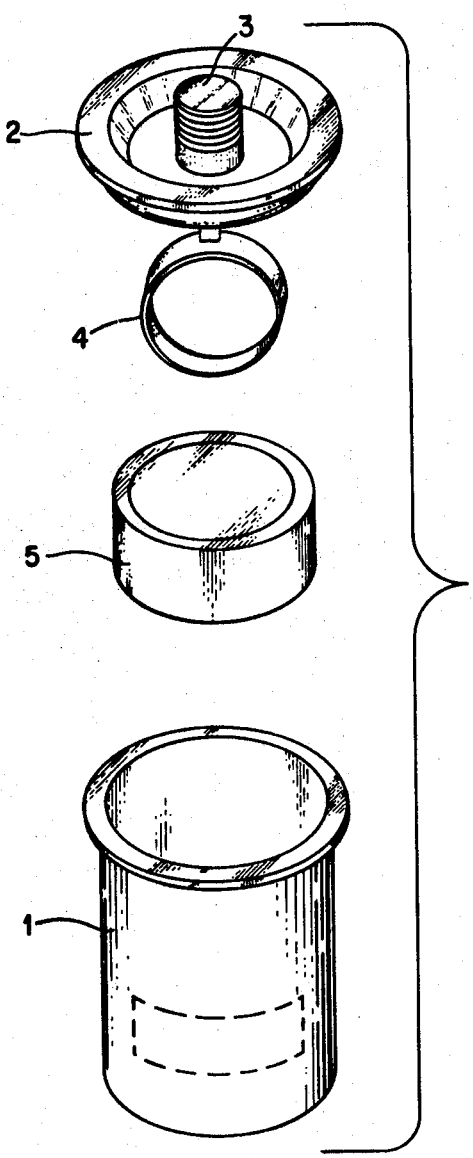
Figure 2:
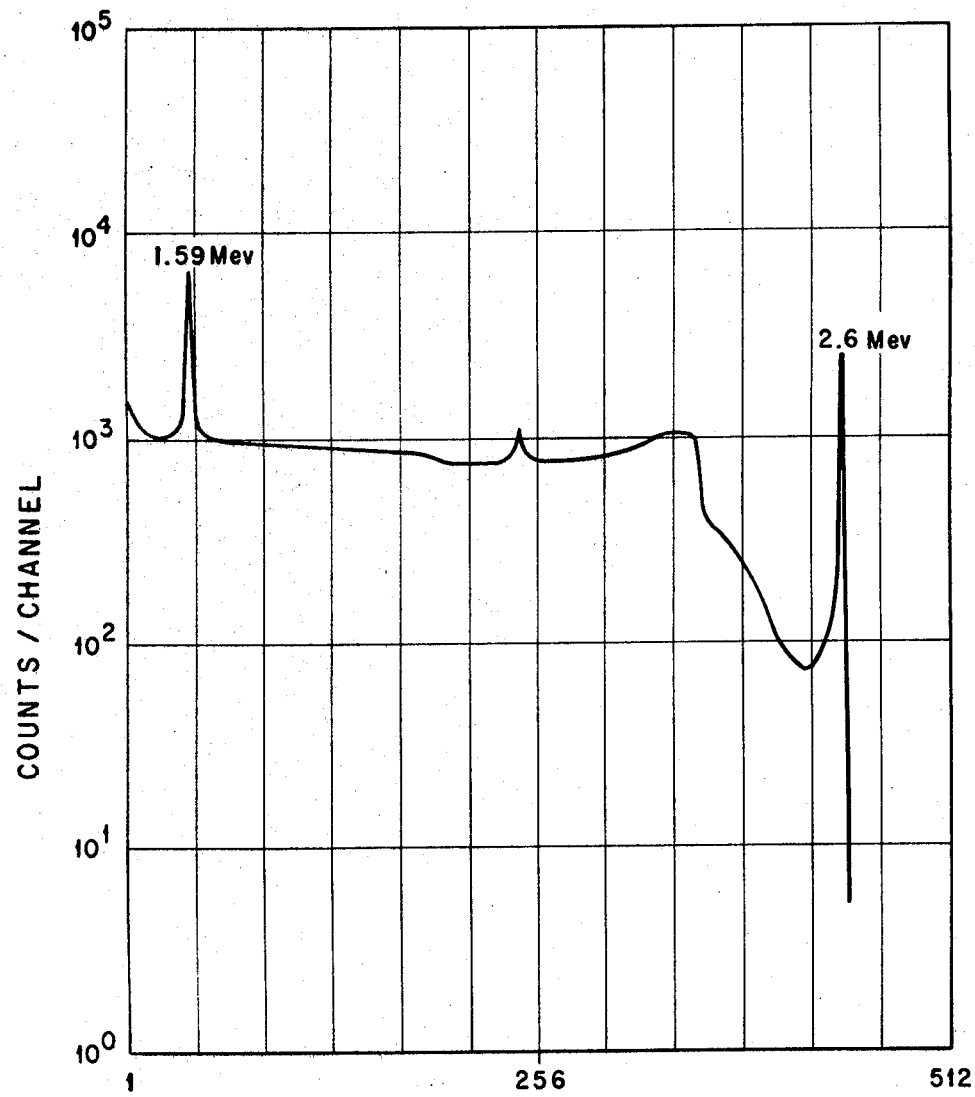

In the drawings, FIG. 1 shows, in exploded form, a lithium-drifted gamma ray detector and the component parts of an encapsulation cannister, and FIG. 2 shows the energy spectrum for Th-C″ as obtained with a germanium detector prepared in accordance with the present invention.

The invention may be considered as a method for preparing and maintaining stable lithium-drifted germanium P-I-N type gamma ray detectors which comprises etching the lithium-doped surface of a conventionally prepared germanium gamma ray detector, applying a deposit of metallic lithium to said etched surface and hermetically sealing said detector in a suitable container under high vacuum.

Applicant has determined from studies of the prior art that the lithium ion is highly mobile in germanium at room temperature. Therefore, the inventor conceived the idea of applying a lithium metal deposit to the lithium-doped surface of the germanium crystal. It was thought that this deposit would provide such a high concentration of lithium at the surface of the detector that the tendency for lithium to drift to the surface would be reversed. Immediately upon application of the metallic deposit, the germanium crystal is hermetically sealed in a cryogenic capsule suitable for immersion in liquid nitrogen.

Referring now to FIG. 1, the detector container is seen to consist of an aluminum cup 1, copper cover 2, electrical feed-through 3, electrical contact 4, and the detector 5. The detector 5 is centered, lithium contact upward, by a shallow counterbore (not shown) in the bottom of cup 1. Electrical contact with the N side of the detector 5 is made by a beryllium copper spring 4 which presses tightly against the detector when cover 2 is closed. Final closure of the capsule is by cold-pressure welding of the mating flanges of the cup 1 and cover 2. Because the welding is performed under vacuum, no pump-out tubulation is needed.

The lithium metal deposit on the N surface of the germanium wafer serves three purposes. The lithium has a low work function so it provides an effective ohmic contact to the semiconductor. Further, it acts as a vacuum "getter" in the capsule thus permitting the use of higher operating bias voltages. Also, the excess of lithium on the surface of the semiconductor reverses the direction of the lithium concentration gradient and this prevents the out-diffusion of lithium ions from the germanium while the device is at or near room temperature.

The following example will illustrate the invention in greater detail.

*Example I*

A gamma ray detector was prepared as described in the following steps:

(1) Slice P-type germanium into wafers approximately 2 cm. in diameter by 1 cm. thick.

(2) Mechanically lap one surface of the wafer to the desired flatness and smoothness.

(3) While protecting the lapped surface, etch the remaining surfaces in a 2:1 $HNO_3$-HF solution for a period of 2 to 5 minutes.

(4) Apply a metallic deposit of Li metal to the etched face by vacuum evaporation. The lapped face and the etched outer rim or edge are masked.

(5) Heat the wafer, under an inert atmosphere, for a period of approximately ½ hour at 375° C. to diffuse the Li and convert the etched surface of the wafer to N-type.

(6) Remove the excess Li with methyl alcohol.

(7) Etch Li-doped surface and the outer rim or edge with $HNO_3$-HF as described in step 3.

(8) Place lapped surface of the Ge wafer on a silver block. While maintaining a temperature of approximately 40° C., apply a reverse electrical bias of 400 volts for about two weeks to drift the Li and compensate most of the crystal, typically about 70% of the total thickness.

(9) Etch Li-doped side of wafer and the outer rim or edge again and apply a metallic Li deposit to only the Li-doped surface by vacuum evaporation.

(10) Immediately place the Ge wafer in the aluminum can described above, evacuate, cold weld, and store in liquid nitrogen.

The energy spectrum of Th-C″ was determined with a detector prepared in accordance with the present invention. The detector was maintained at a temperature of 77° K. and a reverse bias of 600 v. Excellent energy resolution was obtained at 2.61 mev. as shown in FIG. 2. The photopeak is 6 kev. f.w.h.m. or about 0.23%.

While the steps 1 through 8 are generally known in the prior art, the invention resides primarily in the discovery that an application of a metallic lithium deposit applied to a lithium-doped surface essentially stops lithium out-diffusion when the detector is hermetically sealed in high vacuum.

Although the foregoing description applies to the detection of gamma rays, the inventor has found that his improved detectors can be applied to the detection of high energy charged particles as, for example, 60 mev. protons generated by a cyclotron. The aluminum encapsulation can is normally too thick to be used in the detection of charged particles. However, the inventor has found that a "window," shown in dotted lines in FIG. 1, can be provided for the entrance of these particles by machining away a portion of the can side wall. In order to prevent undue weakening of the can, a special machining technique was used which consisted of eccentrically mounting the can in a lathe and machining away more material from one side of the can than the other. Then, by rotating the can 90° with respect to the first eccentric cut and making a second eccentric cut of the same depth, a window can be obtained that has relatively uniform wall thickness for collimated particles. The window, having a thickness of 0.002", permits charged particles to strike the side of the detector and travel across the detector diameter parallel to the plane of the junction thus providing adequate stopping distance. 60 mev. protons, for example, require a detector sensitive depth greater than 1 cm. (i.e., greater than the usual depth of such detectors); therefore, across the diameter of the detector is the only direction which provides adequate sensitive depth for detection of these particles.

In experiments to test the usefulness of this invention in the detection of high energy charged particles, 60 mev. protons from the ORNL cyclotron were directed through the thin aluminum window striking the lithium-drifted Ge detector as described. Results showed that the energy was resolved to ⅓% which is a better resolution than prior art (NaI) detectors by a factor of 3.

Having thus described my invention, I claim:

1. A method of making a germanium gamma ray detector comprising the steps of slicing P-type germanium into a wafer, lapping one face of the wafer, etching the opposite face and outer edge of the wafer, then depositing a metallic coating of Li metal on the etched face by vacuum evaporation, heating the wafer to diffuse a portion of the Li and convert the etched face to N-type, removing the excess Li from the face, etching the said opposite face and outer edge again, attaching the lapped face of said wafer to a heat sink, and then applying an electrode to the etched face of the wafer and drifting the Li to compensate the crystal, and etching said opposite face again and applying a Li protective coating thereto by vacuum evaporation.

2. The method of claim 1 wherein the wafer is then placed in an aluminum container, a cover applied, the container evacuated, the cover bonded thereto and the unit stored in liquid nitrogen.

References Cited

UNITED STATES PATENTS

| | | | |
|---|---|---|---|
| 3,212,943 | 10/1965 | Freck et al. | 148—188 |
| 3,225,198 | 12/1965 | Mayer | 317—235 X |
| 3,310,443 | 3/1967 | Fessler et al. | 148—188 |
| 3,351,758 | 11/1967 | Armantrout et al. | |

WILLIAM I. BROOKS, *Primary Examiner.*